Jan. 9, 1934.   P. M. AULTMAN ET AL   1,942,993
METHOD OF PRODUCING ATHLETIC BALLS
Filed June 3, 1932
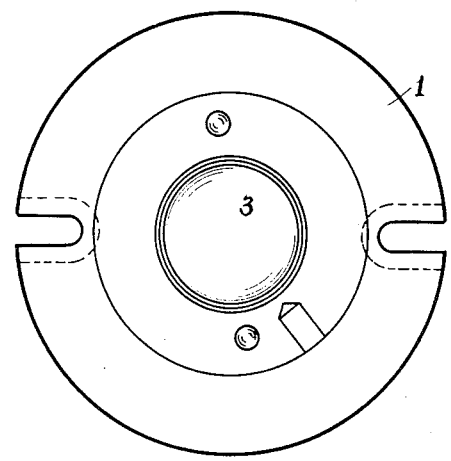
Fig. I
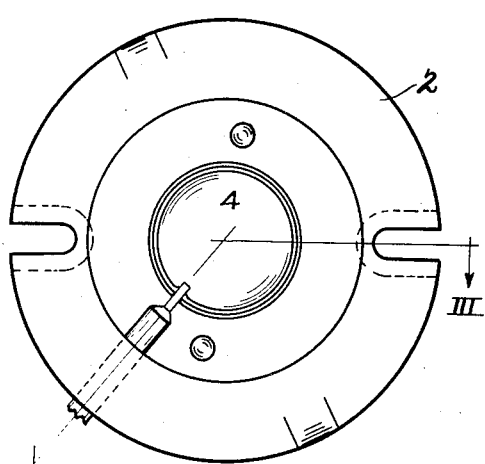
Fig. II
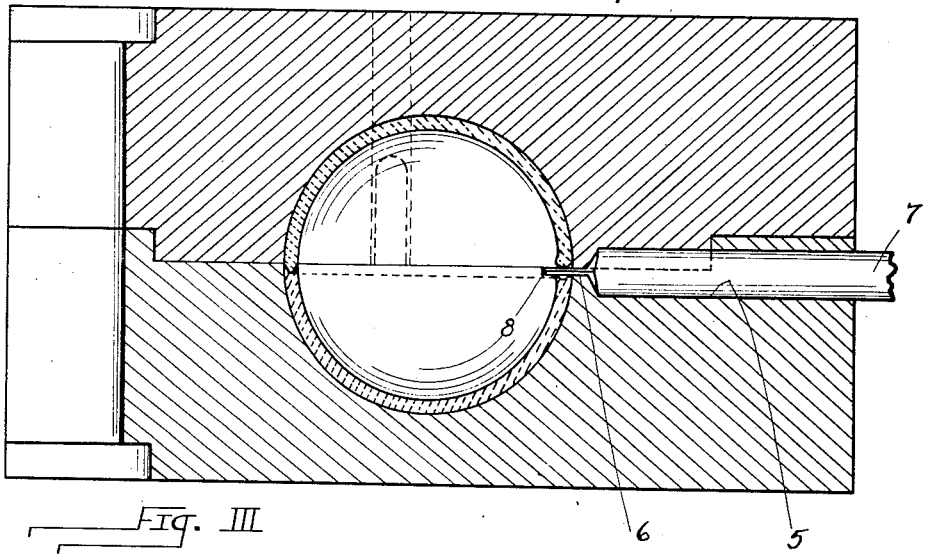
Fig. III
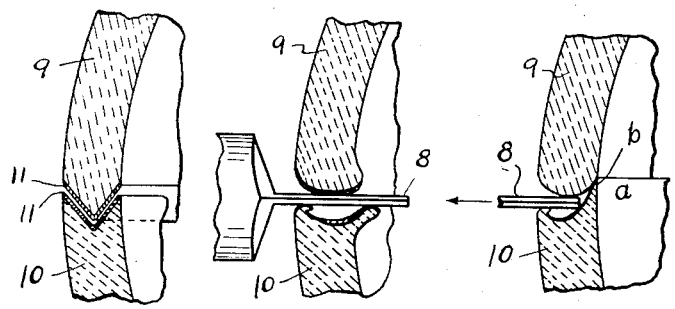
Fig. IV    Fig. V    Fig. VI
INVENTORS
Paul M. Aultman and
Archibald B. Bowers
by Christy Christy and Wharton
their attorneys Patented Jan. 9, 1934

1,942,993

UNITED STATES PATENT OFFICE 1,942,993

METHOD OF PRODUCING ATHLETIC BALLS

Paul M. Aultman and Archibald C. Bowers, Greensburg, Pa., assignors to Pennsylvania Rubber Company, a corporation of Pennsylvania Application June 3, 1932. Serial No. 615,146

3 Claims. (Cl. 18—56)

This invention relates to athletic balls, and to methods of their production. The object in view is an athletic ball of superior character and quality. The application is a continuation, in part, of an application for Letters Patent of the United States filed by us December 26, 1930, Serial No. 504,772.

In the accompanying drawing Figs. I and II are views in elevation, showing the meeting faces of the two companion mold members between which a tennis ball may be vulcanized, the mold being equipped with means for practicing this invention; Fig. III is a view to larger scale, showing in vertical and medial section the mold parts assembled and a ball in place within them; Figs. IV, V, and VI are fragmentary views to still larger scale, showing diagrammatically in section the meeting edges of the two hemispherical shells of which the blank in its preferred form is composed. When by vulcanization within the mold these shells are united, a complete ball is produced. These three figures illustrate in detail certain features of the invention.

Tennis balls consist essentially of thin-walled spheres or rubber, compounded to afford the desired resilience. They are minutely standardized in size, in wall thickness, in weight, as well as in resilience. And standardization in the matter of resilience involves not only the quality of the rubber and the thickness of the wall, but also an accurately determined degree of inflation pressure. In the manufacture of a tennis ball, the wall, which is a spherical shell, is formed by bringing to edge-to-edge abutment within a vulcanizing mold a plurality of shell segments and vulcanizing the segments together to form an integrated whole. The usual procedure, to which we here preferably conform, is to form two hemispherical shell segments and to unite them on an equatorial line. The segments are molded and more or less completely vulcanized. The rubber mix, well known to the art, is initially, and before vulcanization, a plastic, and as such is susceptible to shaping in a mold. Vulcanization, however, destroys plasticity and imparts to the article instead resilience in high degree. The initial vulcanization is carried to such extent that the intermediate article, when prepared for union with its fellow, is changed in character in those respects which have been indicated: it has ceased to be an article of plastic material and has become highly resilient. Indeed, vulcanization may thus preliminarily be carried to substantial completion. The so prepared shells are brought together, edge to edge, with vulcanizable cement upon their edges; and integration of the assembled parts and completion of the ball are effected by vulcanization, while the blank is under compressive strain. Vulcanization under compressive strain is effected within a snug-fitting mold, the gaseous body within the hollow of the blank being of such character and quantity that under the temperature of vulcanization it affords internal pressure of the desired carefully determined magnitude.

Two methods chiefly have hitherto been employed for bringing to the desired value the pneumatic pressure within the ball during its ultimate vulcanization: one of these is to effect within a chamber of elevated pressure the assembly of the hemispherical shells within the mold; the other is to introduce into the space between the shells, just before bringing them together, proper quantities of substances which, under the temperature of vulcanization will react chemically and will by reaction generate gas in such quantity as to bring the pressure to the desired degree. Another method of increasing pressure within a ball—a method heretofore practiced only upon the integrated and otherwise completed article— is to drive a hollow needle through the wall of the ball and to inflate the ball through the driven-in needle to the desired degree of pressure. This method has involved, as a practical circumstance, the provision of a block of soft rubber or the like, applied to the inner wall of the ball, through which piercing is effected. When the needle is withdrawn the soft rubber seals the wound. Such a block of soft rubber, when present, remaining in the finished article, necessarily disturbs the balance of the ball.

In Letters Patent of the United States No. 1,685,423, granted September 25, 1928, to the Pennsylvania Rubber Company, of Jeannette, Pennsylvania, on the application of Lee R. Hurlburt, a ball structure is shown and described in which the two hemispherical shells are shaped with complementary tongue-and-groove edges. While the meeting edges of the hemispherical shells may, in the practice of the present invention, be shaped as one will, we find it preferable to shape them as shown and described in the said Hurlburt patent; and specific features of our invention are realized in employing blank segments shaped according to the teaching of the said Hurlburt patent.

The two mold parts 1 and 2 of the drawing are provided with hemispherical cavities 3 and 4. The mold parts meet in a plane which in Fig. III will be seen to be an equatorial plane. A radially arranged bore 5 with a prolongation 6 of reduced diameter is formed in the meeting faces of the mold parts, and in that bore may be set a pneumatic nozzle 7 with a hollow needle tip 8. This nozzle with its needle tip may in due time be withdrawn from the closed mold.

Fig. IV illustrates the meeting edges of the hemispherical shells 9 and 10 of rubber, and shows them to be shaped to complementary tongue and groove, according to the invention of the Hurlburt patent mentioned above; and this, as we have said, is a feature of the shells which we preferably employ.

In the practice of this invention two complementary hemispherical shells 9 and 10 of rubber are prepared for union by facing their edges with layers 11 of fluid or plastic vulcanizable rubber cement or its equivalent. The shells then are placed in the two mold parts 1 and 2; the pneumatic nozzle 7, 8 is brought to place, and the mold is closed with the parts in the positions shown in Fig. III. In bringing the shells 9 and 10 together the edges, engaging the needle tip 8 of the pneumatic nozzle, are slightly crushed; their plastic-faced surfaces contact upon the surface of the needle 8 and form a complete hermetic seal upon the needle, as is indicated in Fig. V. Inflation through needle 8 follows, and is continued until the pneumatic pressure within the assembled ball has been raised to the desired and predetermined degree. The nozzle is thereupon withdrawn. After withdrawal of the nozzle, vulcanization of the seam of the ball within the mold proceeds in known manner, and the result is a properly vulcanized ball, perfectly balanced, and of accurately determined inflation pressure.

In the withdrawal of the needle from the seam between the meeting edges of the assembled shells 9 and 10 the resilience of the rubber of which the shells themselves are formed, with the co-operation of the plasticity of the cement 11, effects the immediate sealing of the opening, with no loss of the contained body of compressed gas. As has been said, the tongue-and-groove shape of the edges of the shells, described in the Hurlburt patent, is well adapted to the practice of the invention; and still more true is this, if in the Hurlburt seam the depth of the groove exceed the height of the tongue, with the consequent excess of cement in the bottom of the groove. Withdrawal of the needle is illustrated in Fig. VI; and it will be perceived that, as the tip of the needle recedes across the edges of the abutting bodies of elastic material the inner lip $a$ of the groove-edged hemisphere 10 springs to engagement upon the surface of the companion hemisphere 9, at the point $b$, and in so doing seals the seam against the escape of any of the entrapped body of gas, as the withdrawal of the needle continues. When the needle is wholly withdrawn, the meeting edges at the point where the needle had been intruded assume like relative positions as at all other points throughout the extent of the seam—the positions, that is to say, illustrated in Fig. IV. This nicety of seam closure is due to the essential resilience of the material, and it is enjoyed in largest measure if the invention of the Hurlburt patent alluded to be employed, and such is our preference.

The needle which preferably we employ is the needle shown and described in an application for Letters Patent filed May 7, 1931, by Walter E. Humphrey, Serial No. 535,658. It is a needle with flattened tip, of lens-shaped or oval cross-section; and it lends itself to the operations described, with minimum crushing distortion of the walls of the hemispherical shells at the points where they close together upon the needle, and with maximum sealing effect while the needle continues in place between the shells and while subsequently it is being withdrawn.

We have characterized our invention as applicable to athletic balls, and have in describing it limited attention specifically to tennis balls. The term "athletic balls" is commonly used in the industry in contradistinction to "toy balls"; the latter term designates balls such as are commonly used as playthings for little children, and which need not be standardized with precision and nicety, either in dimensions or qualities. Athletic balls lie in a class apart; the tennis ball is typical of the class. As has been said, the tennis ball must be most minutely and accurately standardized in size, weight, and physical characteristics—notably in the matter of resilience. And what has been said of tennis balls applies to athletic balls used in other games—racquets, for example, squash, etc. In the production of these athletic balls of exact specification, the invention may be practiced.

We claim as our invention:

1. The method herein described of making an athletic ball which consists in forming complementary fractional shells of plastic rubber, destroying the plasticity of the material by vulcanization and imparting resilience thereto, facing the edges of the shells with plastic union-forming vulcanizable material, assembling the shells edge to edge within a vulcanizing mold with an inflation needle extending across the seam formed by the meeting and plastic-faced edges of two such shells, and with the resilient shell substance locally compressed upon the needle, inflating through such needle the assembled and mold-contained blank, withdrawing the needle, while permitting the resilience of the compressed shell material to maintain the chamber within the blank sealed against pneumatic leakage, and subjecting the blank within the mold to heat and pressure to vulcanize the union-forming material.

2. The method herein described of making an athletic ball which consists in forming complementary fractional shells of plastic rubber with complementary edges of tongue-and-groove shape-destroying the plasticity of the material by vulcanization and imparting resilience thereto, facing such edges with plastic vulcanizable union-forming material, assembling the shells edge to edge within a vulcanizing mold with an inflation needle extending across the seam formed by the meeting plastic-faced edges of two such shells with localized compression of the shell substance upon the exterior surface of the needle, inflating through such needle the assembled and mold-contained blank, withdrawing the needle, and subjecting the blank within the mold to heat and pressure to vulcanize the union-forming material.

3. The method herein described of producing a hollow tight-walled, inflated athletic ball, which consists in forming to ultimate shape and size resilient, complementary, fractional shells of partially cured rubber, facing the edges of the fractional shells with plastic union-forming vulcanizable material, assembling the shells within a vulcanizing mold and upon an inflation needle in edge-to-edge abutment, and in so doing effecting air-tight union between the meeting edges of the shells and around the external surface of such inflation needle, inflating through such introduced needle the so assembled and mold-contained blank to a predetermined degree of pressure adequate both for vulcanizing purposes and for the permanent inflation of the finished ball, withdrawing the needle and in so doing allowing the air-tight union of the meeting edges of the shells to become complete throughout the extent of a continuous seam of meeting, and then integrating the united shells into a completed ball by subjecting the so-formed blank within the mold to vulcanization.

PAUL M. AULTMAN.
ARCHIBALD C. BOWERS.